Feb. 6, 1968  J. O. KUHN  3,368,063
TOY OVEN

Filed Dec. 23, 1964  4 Sheets-Sheet 1

INVENTOR.
James O. Kuhn
BY Wood, Herron & Evans
ATTORNEYS

Feb. 6, 1968        J. O. KUHN        3,368,063
TOY OVEN
Filed Dec. 23, 1964        4 Sheets-Sheet 2
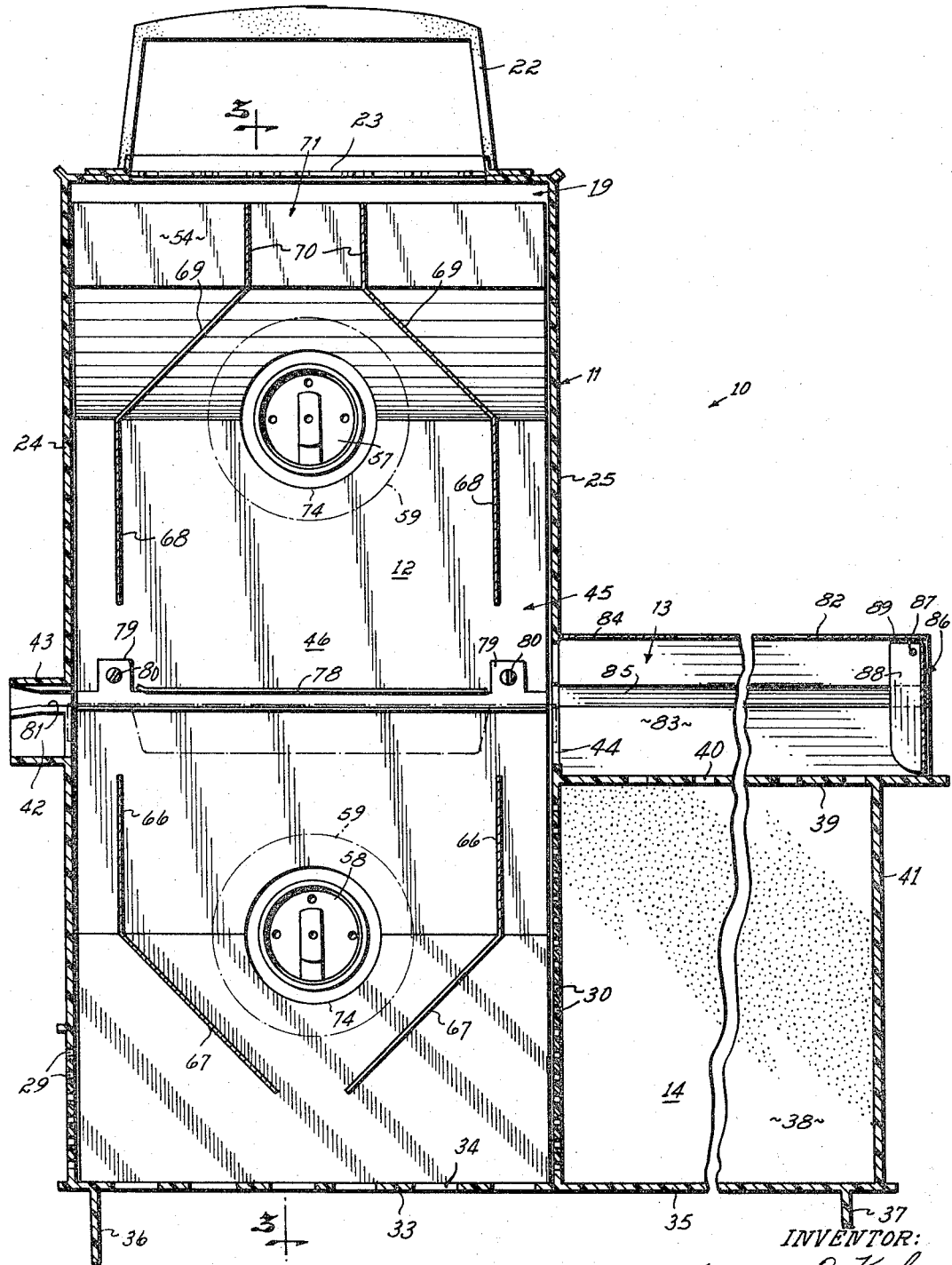

Feb. 6, 1968 J. O. KUHN 3,368,063
TOY OVEN
Filed Dec. 23, 1964 4 Sheets-Sheet 3
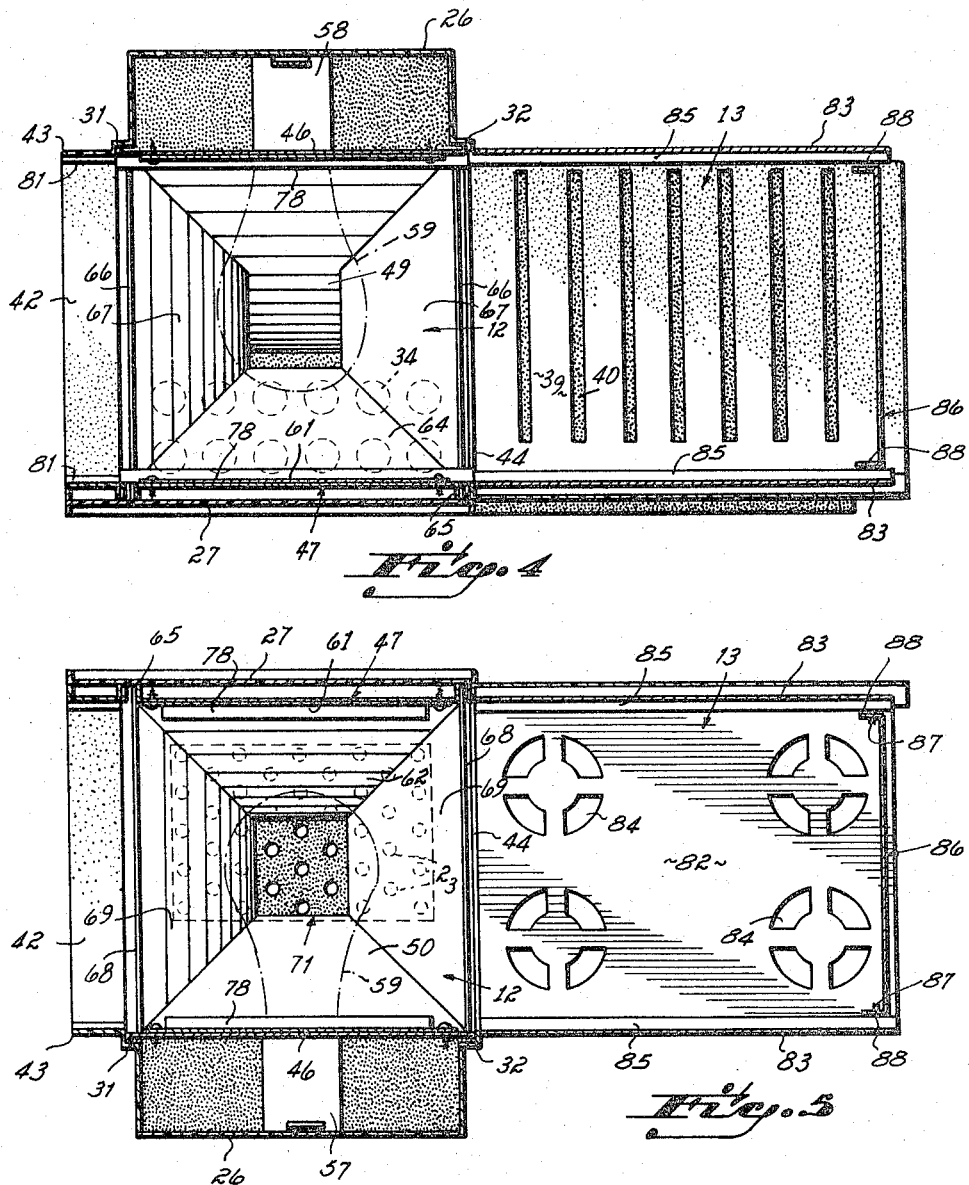
INVENTOR:
James O. Kuhn
BY Wood, Herron and Evans
ATTORNEYS

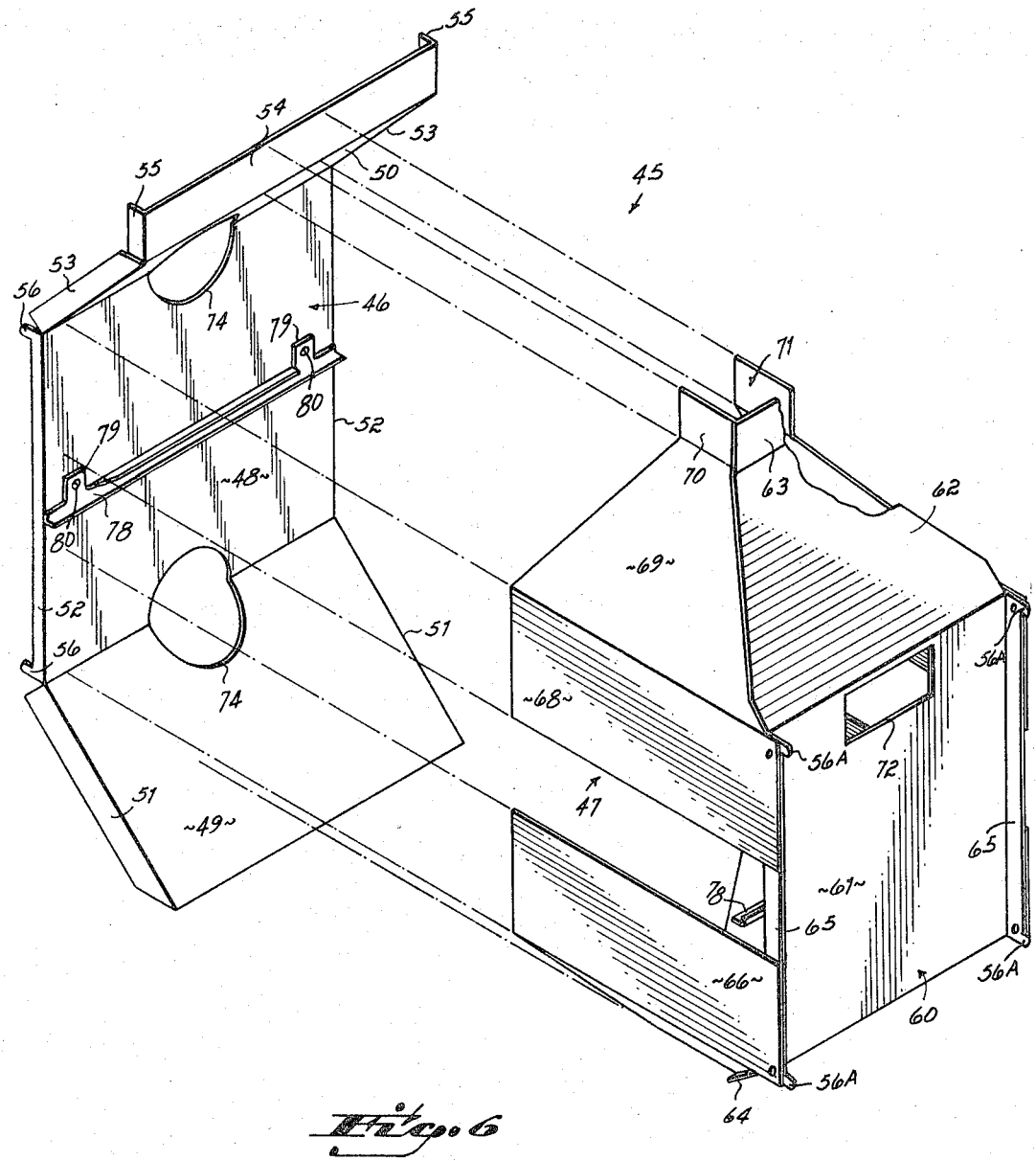

United States Patent Office 3,368,063
Patented Feb. 6, 1968

3,368,063
TOY OVEN
James O. Kuhn, Cincinnati, Ohio, assignor to Kenner Products Company, Cincinnati, Ohio, a corporation of Delaware
Filed Dec. 23, 1964, Ser. No. 420,575
7 Claims. (Cl. 219—411)

ABSTRACT OF THE DISCLOSURE

A toy oven for baking foods that includes a baking chamber and a cooling chamber disposed side by side, there being openings in the walls of the baking and cooling chambers to provide a substantially horizontally aligned passageway through both chambers. The passageway mounts opposed tracks to slidably support a baking pan along the tracks so that pans can be moved successively through the baking chamber, the cooling chamber, and out of the toy by inserting a pan into the baking chamber, thereby pushing the pan already in the baking chamber to the cooling chamber. Light bulbs are located in the baking chamber, both above and below the passageway, to create radiant heat for baking the food contained in the baking pans.

---

This invention relates to toys and it is directed particularly to a toy oven in which a child may bake many varieties of foods "just like mother's" but on a much reduced scale.

The primary objective of the invention has been to provide a miniature but fully operative oven that is as safe as possible for a child to operate. Toward this end the oven is heated by ordinary light bulbs. The temperature generated by these bulbs is found to be adequate for baking purposes, but it is not so great that it cannot be effectively baffled, insulated and vented so that there is no danger of a child being burned by touching any of the exposed parts of the oven, even though it be small in size.

A further objective has been to provide a toy oven of the type set forth in which provision is made for cooling the pans in which the food is baked, and the baked food, to a safe temperature within a cooling chamber that is part of the toy prior to its being made readily accessible to the child using the oven.

Another objective has been to provide a toy oven that a child can operate easily. Preferably, although not necessarily, ready-mixed foods are used and it is found that the average child can turn out excellent baked products with very little instruction using the oven of this invention.

Other objectives and advantages of the invention will be readily apparent from the following description of the drawings, in which:

FIGURE 2 is a vertical cross sectional view taken through the baking and cooling chambers of the oven.

FIGURE 4 is a cross sectional view taken along line 4—4 of FIGURE 3.

FIGURE 5 is a cross sectional view taken along line 5—5 of FIGURE 3, and

FIGURE 6 is an exploded perspective view of the reflector elements of the baking chamber.

Figure 1:
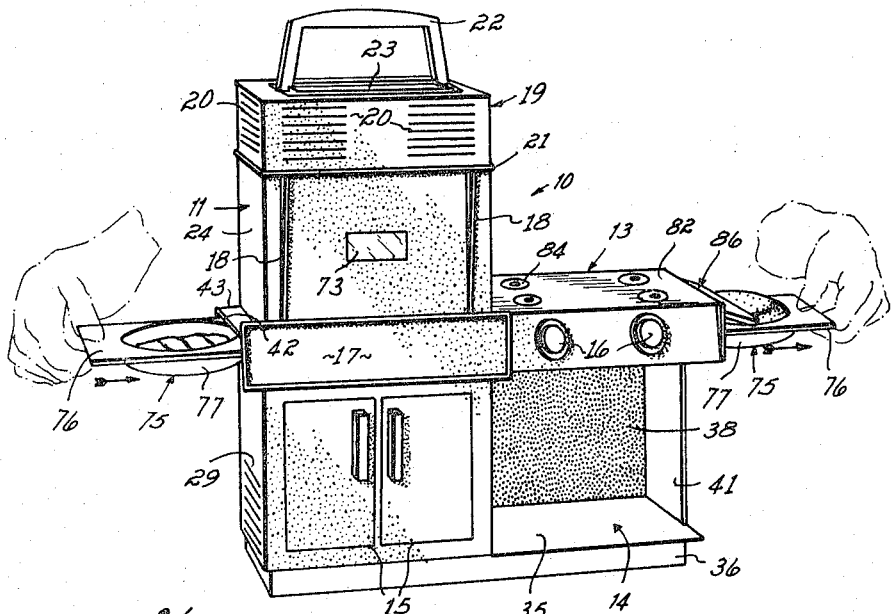
FIGURE 1 is a perspective view of a toy oven constructed in accordance with the principles of this invention.

Preferably the outer shell 10 of the toy is molded of a heat and impact resistant plastic material to simulate a combined range and oven. Generally, the upright part 11 at the left as viewed in FIGURE 1 encloses a baking chamber 12. The parts to the right in this figure constitute a cooling chamber 13 and a storage compartment 14. To add to the realistic appearance, items such as doors 15, control knobs 16, a front plate 17 and ribs 18 are molded separately or as part of shell 10 simulating their counterparts in an actual range and oven. Baking chamber 12 is capped with a ventilated dome 19 that may be molded as part of the shell. This dome has slits 20 in its sides and to give it a somewhat detached appearance it is defined by horizontal ribbing 21. A handle 22 is attached to dome 19 to assist in carrying the toy. When the toy is in use this handle serves as a guard for a perforated vent plate 23 that is in the top of the baking chamber. It is found that this vent plate is the only part of the toy that is too hot to touch comfortably when the toy is in use.

The upright part 11 at the left in FIGURE 1 is essentially a box-like structure, except for the embellishments to which reference has been made, comprising side walls 24 and 25, a rear wall 26 and a front wall 27.

Figure 3:
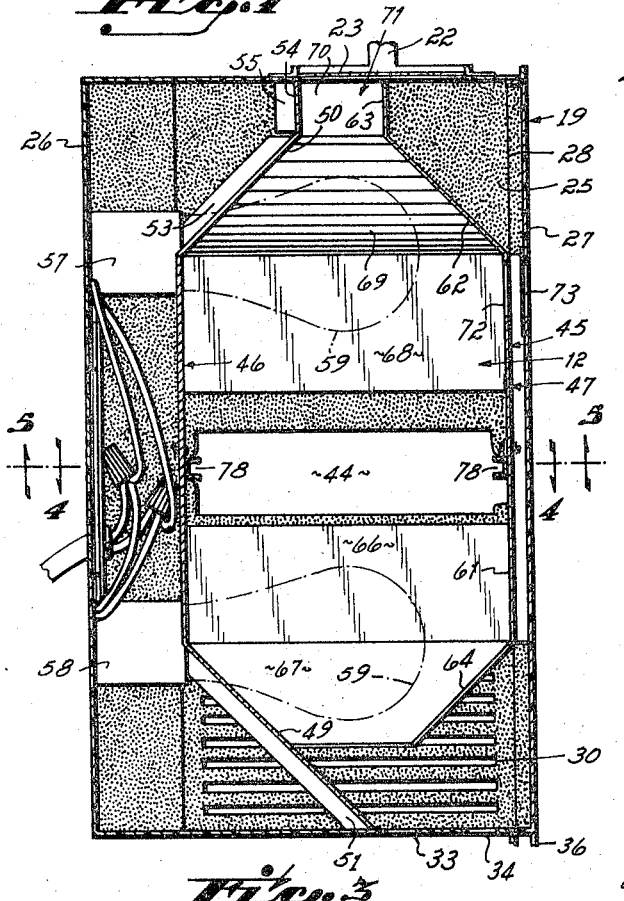
FIGURE 3 is a cross sectional view taken along line 3—3 of FIGURE 2.

Preferably the front wall is separatable from the rest of the shell along lines such as the one shown at 28 in FIGURE 3 to provide access into baking chamber 12 for assembly purposes, cleaning, and the like. Fasteners such as screws (not shown) may be used to hold front wall 27 in place. The lower parts of both of the side walls 24 and 25 are slotted as shown respectively at 29 in the case of wall 24 and at 30 in the case of wall 25 (FIGURE 2).

The rear portion of the upright part 11 of the toy is inset slightly as best seen in FIGURE 4 to provide two shoulders 31 and 32. The purpose of these shoulders will be explained below. The bottom of the upright part of the toy includes a floor 33 having holes 34 in it to admit air. A continuation 35 of floor forms the floor of the storage compartment 14. Short legs are provided at the two ends of the toy, these legs being designated 36 and 37 respectively, which serve to elevate floor 33 off of a supporting surface so as to permit free flow of air through the holes 34. Additional molded parts of the shell include a back wall 38 for storage compartment 14, and a horizontal table 39 having a series of vent slots 40 therein. The table 39 parallels the bottom of the storage compartment and it is the bottom of the cooling compartment 13. There is also an end wall 41.

Side wall 24 of the upright part 11 of the toy has a slot or opening 42 in it to provide access to the baking compartment. This slot is surrounded by a rectangular, projecting skirt 43. Opposite the slot 42 there is a rectangular opening 44 in the side wall 25 and this opening provides a passage for food from the baking compartment 12 into the cooling compartment 13, this latter compartment to be described in detail at a later point.

The chamber in which foods are baked is spaced from the molded plastic walls of the upright part 11 by means of reflector plates that are formed to the configuration best illustrated in FIGURE 6. As shown, this configuration comprises an oven liner designated generally 45. This liner is made of sheets of material such as polished steel to provide mirror-like surfaces at the interior thereof. There are two pieces to the oven liner, one a back part, designated generally 46, and the other a forward piece designated generally 47. As will be seen, no permanent fasteners are required to hold these two pieces in assembly in the toy oven. The back piece is as wide as the distance between side walls 24 and 25. As viewed from the front this piece 46 is rectangular in outline. It consists of a vertical back wall 48 that is rectangular, a lower forwardly slanting plate 49 that is disposed at approximately 45 degrees to vertical plate 48, and an upper slanting plate 50 that is also angulated with respect to the back wall 48, the two plates 49 and 50 flaring respectively, downwardly and upwardly with respect to wall 48. The lower slanting plate has two flanges 51—51 turned down at right angles at the opposite side edges thereof to present supporting surfaces to the two side walls 24 and 25. Back wall 46 also has similar flanges 52—52 turned rearwardly. Additionally, the upper, slanting plate 50 has side flanges 53—53 turned upwardly therefrom. Also, the forward edge of the slanting plate 50 has a vertical flange 54 turned upwardly therefrom, the opposite ends of this flange being turned over at right angles as at 55—55 to provide additional support flanges paralleling flanges 51—51, 52—52 and 53—53 so that the piece 46 has supports all along both side edges to contact the two walls 24-25. Importantly, the two flanges 52—52 at the sides of the vertical part 48 of piece 46 has four lugs 56 that project rearwardly from the four corners of the back wall 48. These lugs engage in slots (not shown) in the two shoulder areas 31-32 formed at the inset section of the rear wall area of upright piece 11. Thus, when the piece 46 is placed into the position shown in FIGURE 3, these lugs engage the slots in the offset shoulders and hold the back wall 46 of this part of the oven liner in spaced relation to the rear wall 26 of the oven section of the toy. As shown, the wiring for the oven is installed in the space thus provided. It consists of the usual wiring for two electrical sockets, an upper one 57 and a lower one 58. Conventional 100 watt light bulbs 59—59, shown in phantom lines in the drawings, are adapted to be received in these two electrical sockets. As will be seen, each bulb is placed such that heat radiating therefrom is directed downwardly in one instance and upwardly in the other instance into the area into which food to be baked is placed in the toy oven.

The forward piece 47 of the oven liner comprises a series of plates. The first of these is a plate designated generally by the numeral 60. It comprises a rectangular section 61 having a triangular section 62 bent over at 45 degrees thereto, toward the rear. The upper end of section 62 is flanged as shown at 63. Another angulated flange is turned over as shown at 64 from the bottom edge of the section 61 and this flange 64 matches generally the one designated 49 that is part of piece 46. However, it does not extend all of the way down to the floor 33 of this compartment as does the plate 49 (see FIGURE 3.) The wall 61 has two flanges 65—65 turned forwardly from its opposite sides and these provide anchors for additional parts of the oven liner. The two sides of this section of the oven liner are identical and the description of one will suffice for both sides.

In the lower portion thereof there is a plate 66 extending rearwardly, this plate having an inturned flange 67 at the underside thereof that is slanted at approximately 45 degrees. The two side edges of this slanting flange 67 are canted to match and to rest upon slanting plates 49 and 64 of the two sections of the liner. In the upper area of the side there is provided a plate 68 that has an integral triangular portion 69 extending inwardly at an angle equal approximately to 45 degrees that mates with the slanting triangular section 62 of the forward part of the oven liner. The side also has an upturned flange 70 matching the upturned flange 63 so that, in assembly, the flanges 70—70, flange 63, and flange 54 form a stack 71 through which heated air rises and passes out of the oven through the vent plate 23.

The forwardly turned flanges 65—65, in assembly, rest against the inner face of the forward wall 27, as best shown in FIGURE 3. Tabs 56a similar to rear tabs 56 engage in slots (not shown) in front wall 27 to support front piece 47 of the oven liner. When thus resting against this wall, the rear edges of the forward piece 47 of the oven liner assembly rest against matching surfaces of the rear piece 46 as indicated by the phantom lines in FIGURE 6. It will be seen that the wall 61 of the forward piece of the oven liner has a slot 72 cut therein, this slot in assembly being opposite a glass window 73 in the front of the upper part of the oven, this window permits a view into the interior of the baking oven so that children using it may determine by sight when the food being baked is finished.

The rear piece 46 of the oven liner has two holes pierced in it as shown at 74—74 that are aligned with the two electrical sockets 57, 58. In assembly, the stems of the two light bulbs 59—59 extend through these holes and into the sockets as best illustrated in FIGURE 3. As shown in FIGURES 2 and 3, the slanting surfaces of the oven liner serve as reflecting surfaces for radiant heat emanating from the two light bulbs and direct this heat both downwardly and upwardly into the area that is at the center of the baking oven.

Baking pans such as those shown at 75—75 in FIGURE 1 are provided as an integral part of the oven toy. Each one of these pans has a planar, rectangular rim 76 and a dish area 77 within the rim. These pans may be stamped from steel and it is preferred that three be provided as a set with each oven toy. An important consideration is that each tray be substantially as long as the distance between the side walls 24 and 25 of the baking oven, and that the cooling chamber to be described in detail later be also aprpoximately this same length.

Opposed track members 78—78 extend horizontally through the baking chamber, these tracks being channel shaped in cross section with the open sides of the channels facing toward one another and with endwise areas thereof configurated to provide tabs 79—79 that are adapted to be fastened to the walls of the oven liner as shown at 80. The channel portions of the two opposed tracks are adapted to receive the opposite side edges of the baking pans and thus support them between the tracks so that the tops and bottoms of the pans and the food therein are exposed to the radiant heat emanating from the two light bulbs 59—59. The skirt 43 that surrounds the slot 42 within wall 24 also has track extensions 81 matching the track sections 78 molded into them as shown in FIGURE 2.

The cooling chamber preferably is formed of sheet metal bent into an inverted channel consisting of a top panel 82 and front and rear panels designated as 83—83. In order to vent the cooling chamber the panel 83 has four sets of apertures 84 cut through it. As shown, these apertures are configurated to simulate the burners of a range. The apertures 84 cooperate with the slots 40 in the wall 39, that forms the bottom of the cooling chamber, to permit a flow of air through the cooling chamber. The forward and rearward walls 83—83 of the cooling chamber are also configurated to provide grooves 85—85 that match and are in alignment with the channel-like tracks 78—78 that pass through the baking chamber. These grooves 85 thus constitute extensions of the trackway through the toy so that a pan may be engaged within the trackways 78—78 and then pushed on through the toy going from the baking oven 12, through opening 44 and into the cooling chamber 13.

The open end of the channel-like configuration that forms the cooling chamber is normally closed by means of a hinged door 86. This door is pivoted about two pins 87—87 that pass through inwardly turned flanges 88—88 at the opposite ends of the door and are supported in the walls 83—83 so that the door hangs vertically to close the open end of the channel as best shown in FIGURE 2. It will be noted that the upper edge 89 of each one of the inwardly turned flanges 88 closely follows the underside of top 82 of the cooling chamber so that it is not possible to push the door 86 inwardly. It is possible however that the door swing outwardly under the force of a pan moving through the cooling oven along the trackway provided.

In operation therefore, the child places the ingredients to be baked in one of the pans and it is inserted into the baking oven through a slot 42 where its opposite side edges are supported in the opposed tracks 78—78 for exposure to heat radiating from the two light bulbs. When it is observed through the window 73 that the baking is completed the second pan, containing ingredients if desired, or empty, may be pushed through slot 42 to shove the first pan on into the cooling chamber. If a second product is to be baked in the second pan the first pan thus remains in the cooling chamber until the ingredients of the second pan have been baked. When this occurs, the third pan may be used and inserted through slot 42 to push the first pan out through door 86 while transferring the second pan from the baking chamber into the cooling chamber. In this way a child may bake many different types of foods and with a little experience turn out baked products that are excellent.

What is claimed is:

1. A toy oven comprising walls defining a baking chamber, means defining opposed tracks to support opposite side edges of baking pans therebetween extending horizontally through said baking chamber from a first side thereof to a second side thereof, a first heat reflector within said baking chamber below said opposed tracks, a second heat reflector within said baking chamber above said opposed tracks, means venting to the atmosphere the areas above and below said reflectors, a first light bulb and electric socket means disposed to place said bulb between said first reflector and said opposed tracks, a second light bulb and electric socket means disposed to place said bulb between said second reflector and said opposed tracks, whereby the area between said opposed tracks is heated both from above and below upon the energization of said bulbs, a cooling chamber disposed at said second side of said baking chamber, second opposed tracks extending through said cooling chamber as an extension of said opposed tracks within said baking chamber, and the lengths of said first and second opposed tracks being substantially the same.

2. A toy for baking foods comprising three substantially identical, rectangular baking pans adapted to receive foods to be baked, walls defining a baking chamber, there being a slot in one of said walls of a size to permit the insertion of a pan into said baking chamber, opposed tracks extending horizontally through said oven from said slot, said tracks being disposed to receive the opposite side edges of a baking pan in sliding relation to support said pan therebetween, a first electric light bulb and heat reflector means in said baking chamber disposed to direct radiant heat downwardly toward the top of a pan supported between said tracks, a second electric light bulb and heat reflector means disposed to direct radiant heat upwardly toward the bottom of a pan supported between said tracks, means defining a vented cooling chamber at the side of said baking chamber opposite said slot, there being an opening between said chambers, said opposed tracks extending through said opening from said baking chamber and through said cooling chamber, the lengths of said tracks within said oven and within said cooling chamber being substantially the same and substantially as long as one of said pans, there being a second slot in said means defining said cooling chamber at the end of said tracks, a hinged door normally closing said second slot but openable from the inside when there is one pan in said baking chamber, a second in said cooling chamber and a third is inserted into the first mentioned slot and moved along said opposed tracks to push said second pan against said door.

3. A toy for baking foods comprising three substantially identical baking pans that are rectangular in outline and adapted to receive foods to be baked, means defining a baking chamber and a cooling chamber, said chambers being side by side, means venting both chambers to the atmosphere, there being a first opening in one side of said baking chamber of a size to permit insertion of one of said pans, a second opening between said chambers to permit the passage of one of said pans from chamber to chamber, and a third opening to permit a pan to pass from said cooling chamber, said openings being aligned, opposed tracks extending from said first opening through said second opening and to said third opening, said tracks disposed to receive the opposite side edges of a pan in sliding relationship and thereby support said pan between them, each of said chambers being substantially as wide in the direction said tracks extend as the width of a pan, a door normally closing said third opening but openable from the inside of said cooling chamber by pressure of a pan thereagainst, whereby said door may be opened when there is a pan in each of said chambers by the insertion of a third pan into said baking chamber through said first opening, means for generating radiant heat within said baking chamber, and means to direct radiant heat simultaneously toward the top and bottom of a pan supported by said tracks within said baking chamber.

4. A toy for baking foods comprising walls defining a baking chamber and a cooling chamber disposed side by side, there being openings in said walls to provide a horizontal passage extending through both chambers, opposed tracks disposed in said passage adapted to support a baking pan in slidable relationship between said tracks, radiant heat means disposed in said baking chamber both above and below said passage, and reflector means to direct radiant heat toward a baking pan supported between said tracks.

5. In a toy as set forth in claim 4, a door normally closing the opening in the cooling chamber at the side thereof opposite said baking chamber, and means hingedly mounting said door to swing open when a baking pan is forced thereagainst from inside said cooling chamber.

6. A toy for baking foods comprising walls defining a baking chamber and a cooling chamber, means venting each chamber to the atmosphere, means adapted to slideably support a baking pan in said baking chamber by contact with the opposite side edges only of said pan, heating and heat reflecting means disposed both above and below the area in which a pan is adapted to be so supported, and there being an opening of a size to permit passage of a pan from said baking chamber into said cooling chamber.

7. A toy as set forth in claim 6 in which said cooling chamber is aligned horizontally with said means adapted to slideably support a baking pan.

References Cited

UNITED STATES PATENTS

| | | | |
|---|---|---|---|
| 1,282,195 | 10/1918 | Crary | 219—405 X |
| 1,969,614 | 8/1934 | Klopfenstein | 219—395 |
| 2,860,225 | 11/1958 | Steen | 99—389 |
| 2,864,932 | 12/1958 | Forrer | 219—405 X |
| 3,088,396 | 5/1963 | Proffitt | 126—21 X |

RICHARD M. WOOD, *Primary Examiner.*

C. L. ALBRITTON, *Assistant Examiner.*